United States Patent [19]

Foshee

[11] 4,189,622
[45] Feb. 19, 1980

[54] DATA COMMUNICATION SYSTEM AND BIT-TIMING CIRCUIT

[75] Inventor: James J. Foshee, Dayton, Ohio

[73] Assignee: NCR Corporation, Dayton, Ohio

[21] Appl. No.: 847,529

[22] Filed: Nov. 1, 1977

Related U.S. Application Data

[63] Continuation-in-part of Ser. No. 623,518, Oct. 17, 1975, abandoned.

[51] Int. Cl.² .................. H04L 7/04; H04L 5/22; H04J 3/06; H02B 1/00
[52] U.S. Cl. ..................... 178/69.1; 178/53; 179/15 BS; 325/30; 325/320
[58] Field of Search ........... 178/53, 67, 69.1, 88; 179/15 BS; 325/30, 320

[56] References Cited

U.S. PATENT DOCUMENTS

| | | | |
|---|---|---|---|
| 3,739,277 | 6/1973 | Schneider et al. | 325/30 |
| 3,938,052 | 2/1976 | Glasson et al. | 325/320 X |
| 3,938,082 | 2/1976 | Schowe, Jr. | 178/69.1 X |
| 4,002,845 | 1/1977 | Kaul et al. | 178/69.1 X |
| 4,010,323 | 3/1977 | Peck | 178/69.1 X |

Primary Examiner—Robert L. Griffin
Assistant Examiner—Aristotelis M. Psitos
Attorney, Agent, or Firm—J. T. Cavender; Stephen F. Jewett; Edward Dugas

[57] ABSTRACT

A digital timing system and method is disclosed for improving the bit-error-rate performance of digital communications systems, such as satellite communications links which experience deep fades caused by ionospheric scintillation with resultant loss of synchronization for multibit time durations. The present invention prevents timing loss and bit-shift under such ionospheric conditions, and is also applicable to land lines, computer communications links and any other communication channels vulnerable to timing loss and resultant data bit-shift caused by noise, extraneous transitions or transmission line anamolies.

A novel bit-timing circuit is described which analyzes incoming phase-shifted digital data transitions to select a "best-fit" clock from a plurality of discrete clocks of like frequency but displaced in phase for clocking the data. The discrete clocks are derived directly from a highly stable crystal oscillator source. Incoming data transitions are converted to pulses multiplexed in time to divide the data bit periods into a plurality of incremental time intervals, each time interval being associated with a data accumulator and one of said discrete clocks for counting data transitions over a predetermined number of bits. The contents of the accumulators are monitored to determine whether the data therein is valid or invalid, with a preponderance of data in any one accumulator being indicative of valid data. Valid data is clocked out by the "best-fit" clock while an invalid data indication inhibits the shifting of clock phase until valid data is again received.

7 Claims, 19 Drawing Figures

DATA COMMUNICATION SYSTEM AND BIT-TIMING CIRCUIT

CROSS REFERENCE TO RELATED APPLICATION

This is a continuation-in-part of U.S. application Ser. No. 623,518, entitled DATA COMMUNICATION SYSTEM AND BIT-TIMING CIRCUIT, filed Oct. 17, 1975, in the name of James J. Foshee and assigned to the assignee of the present invention.

BACKGROUND OF THE INVENTION

1. Field of the Invention

The invention relates generally to digital communications system, including UHF satellite communications to mobile terminals, such as aircraft, ground terminals, etc.; to hardwired data communications between data processing equipment connected by land lines, and to any other communications link susceptable to the effects of noise, fading, bit-shift or any other interference which could result in synchronization errors, extraneous transitions and data errors.

More particularly, the invention relates to a digital modulation/encoding system and method for overcoming the deleterious effects of ionospheric scintillation in satellite communications systems to permit reliable digital communications in the up-link signal to the satellite and the down-link signal from the satellite, notwithstanding the deep signal fades which such disturbances can produce, which heretofore could render a UHF satellite communications link inoperative.

The invention also relates to a modulator/demodulator (modem) for operating over communication links disturbed as aforementioned; having a rapid synchronization acquisition time without lessened bit-error-rate (BER) performance; having the capability to correct "burst" errors, or sudden extraneous noise spikes, caused by fading; and having the capability of deriving and maintaining a highly stable clock, even during fading, for preventing data bit-shifts or other errors in timing and data decoding.

The invention also relates to apparatus and method for generating digital timing signals and for preventing bit-shifts as small as a single bit in communications channels, even when incoming noise or other channel disruptions cause a loss of signal for time durations of as great as three (3) seconds or more.

2. Description of the Prior Art

Digital data communications systems, whether hardwired or UHF satellite links require timing, or synchronization signals that are continuously synchronized with incoming asynchronous data, which data is in the form of binary bits, each bit occurring within a bit "cell" or period, and being encoded with transitions within the bit cell in accordance with any of a number of well known encoding schemes. In reading, or decoding such digital data, for example, NRZ-1 data wherein transitions occur from one binary state to another whenever a digital "ONE" is encoded, it is desirable that decoding occur by sampling the data transition at or near the center of the "bit cell", or "bit", which is used interchangeably herein. Thus, system timing should occur near the center of the bit, whether or not a transition occurs in any particular bit cell, and bit-shift from the bit center is indicative of phase error. Additionally, timing must be maintained under conditions of signal loss or fade, which is difficult or impossible in systems utilizing the incoming signal transition to generate the system timing under such conditions.

Many bit-timing recovery schemes have been devised in the prior art for regenerating and decoding discrete data, which may be modulated in any number of forms, such as phase shift keyed (PSK) or frequency shift keyed (FSK), wherein the information desired to be transmitted is modulated onto a carrier of a given frequency by effecting predetermined phase shifts (PSK) or frequency shifts (FSK) as the case may be, in the carrier corresponding to the information to be transmitted. A PSK signal thus is of a particular frequency with portions at some arbitrary zero phase and other portions differing in phase from the zero phase portion. A common decoding technique is the phase locked loop (PLL), either analog or digital, wherein the decoder timing is continuously adjusted to "follow" variations in incoming bit-shift, i.e., phase displacement. Such systems are generally unsatisfactory for decoding asynchronous data or for decoding data in systems experiencing signal loss for multi-bit time durations since the acquisition time, or locking to the data bit stream once resumed consumes time during which decoding does not occur, resulting in loss of data.

One such digital phase locked loop of the prior art is described by U.S. Pat. No. 3,509,471 wherein a bit timing recovery circuit produces a local pulse stream synchronized to transitions in the incoming data. Another phase locked loop decoder for decoding a double frequency encoded data signal, i.e., data bits are interleaved between clock pulses, is disclosed by U.S. Pat. No. 3,825,844. In this prior art decoder, "windows", or predetermined time periods are derived for decoding data. When the data occurs outside of the window, it is not decoded.

A computer clock phase lock for restarting a computer with all clocking circuits operating in a known relationship is described by U.S. Pat. No. 3,245,048 wherein a plurality of clock signals cause the computer to cycle when stopped at such known phase relationship.

U.S. Pat. No. 3,739,277 discloses a differentially coherent phase shift keyed digital transmission system (DPSK) having digit groups of data controlling the phase shift modulation. After several cycles of carrier are transmitted, the phase is shifted for the next group of digits. For each three-cycle segment of carrier, the number of phase matches is counted to determine the phase of the received signal on the basis of the occurrence of plural matches.

It is to be understood that the present invention, while relating to an apparatus and method of extracting bit-timing from a disturbed communication channel, is also applicable to extracting bit-timing from non-disturbed transmission channels, such as telephone lines. Also, the particular encoding scheme utilized, whether RZ, NRZ, NRZ-1, phase-encoding (Manchester), frequency encoding, (Harvard), etc. is not critical to the present invention, as the timing technique described herein is useful in decoding any of the above exemplary digital codes. Further, the present invention, while described in the context of an FSK-UHF satellite communication system, is not limited to any particular modulation scheme, and is applicable to PSK, DPSK and other known modulation techniques.

SUMMARY OF THE INVENTION

The present invention comprises a circuit for eliminating extraneous transitions, either interleaved with valid data or on a separate clock line, and for maintaining an accurate clock during prolonged periods of noise and/or signal fade in a communications channel or transmission line. A novel bit-extractor circuit analyzes demodulated data and generates and selects a "best-fit" clock from a plurality of discrete clocks of like frequency but displaced in phase. Phase, or bit-shifts in the incoming data shifts the clock selected one predetermined phase increment at a time to maintain synchronization and a "best-fit" between the clock and data transitions and for inhibiting the clock selection from changing when invalid data such as noise spikes are present. A fade-resistant modem having a digital modulation/encoding technique incorporating the present bit-extractor circuit is disclosed for improving the BER performance of a digital UHF satellite communications link disturbed by ionospheric scintillation.

The bit-extractor includes a stable frequency source for generating the plurality of phase-displaced discrete clocks, a plurality of data transition accumulators for counting pulses indicative of data transitions from a plurality of portions of each bit-cell to determine by "weight", i.e., contents of the accumulators, whether valid data is present, a multiplexer for switching the clocks in accordance with the accumulator contents, and a data validation circuit for monitoring the accumulator contents to distinguish valid data (accumulation by one accumulator) from invalid data (accumulation by more than one accumulator). The clock associated with the accumulator accumulating the most transitions (the derived clock) is compared in a digital comparison circuit with the present clock. The resultant or new clock is the same as the present clock if the derived clock and the present clock are the same. If the derived and present clocks are different, the new clock becomes the next phased clock adjacent to the present clock in the direction (phase) of the derived clock. Thus, phase changes in valid data continuously and incrementally phase adjust the system clock. When data is invalid, i.e., accumulation by a plurality of accumulators or insufficient accumulation in any one accumulator to insure valid data, the present clock is maintained as the new clock, thereby insuring that noise will not cause a clock change.

It is therefore an object of the invention to provide an improved digital communications system and method for deriving and maintaining accurate data timing in a disturbed communications channel.

It is another object of the invention to provide a fade-resistant modem for a digital UHF satellite communications link disturbed by ionospheric scintillation or other phenomena.

It is another object of the invention to eliminate extraneous transitions in the clock lines of digital systems such as computers connected by land-lines which may be vulnerable to the effects of noise and/or transmission line anamolies.

Yet another object of the invention is to provide a novel bit-timing extractor circuit for compensation of phase shift in incoming data by generating and selecting a best-fit clock from a plurality of phased clocks.

Yet another object of the invention is to prevent bit-shift in a communications channel experiencing temporary multi-bit signal loss.

Yet another object of the invention is to provide a highly accurate clock for an FSK modulator and demodulator utilizing convolutional encoding and feedback decoding with data interleaving to correct errors in the data stream due to fading.

It is yet another object of the invention to provide a circuit for validation of digital data.

BRIEF DESCRIPTION OF THE DRAWINGS

The foregoing and other objects, features and advantages of the invention will be apparent from the following detailed description of the preferred embodiments of the invention as illustrated by the accompanying drawings wherein certain figures double width lines indicate the flow.

DESCRIPTION OF THE PREFERRED EMBODIMENTS

Figure 1:
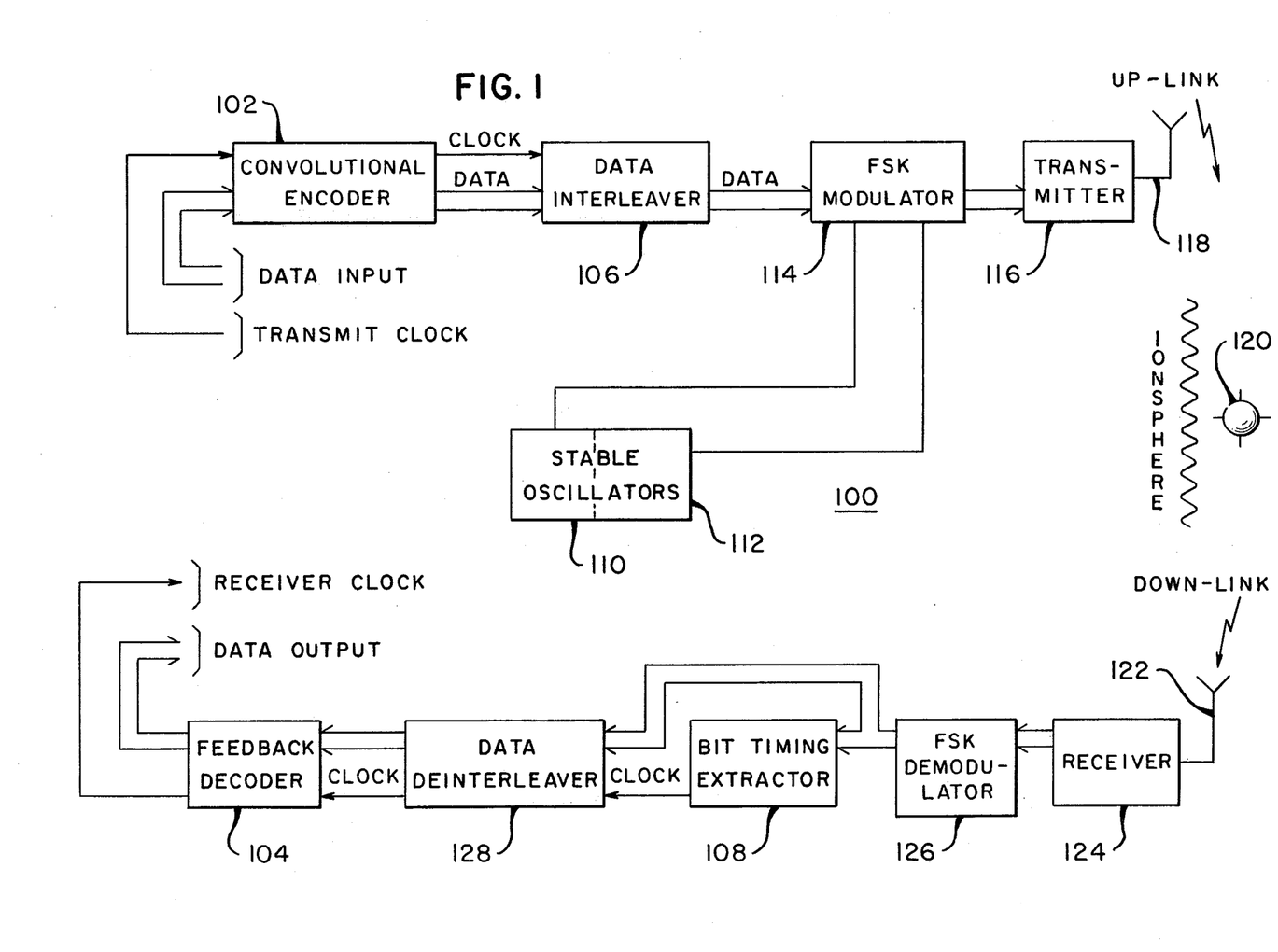
FIG. 1 is a simplified block diagram of a communications system incorporating the present invention.

Referring now to FIG. 1, a fade-resistant modem for use in a satellite communication system transmission link disturbed by ionospheric scintillation fading is illustrated generally at 100. While the illustrated system is two-tone FSK having "ONE" and "ZERO" levels, any communication links wherein rapid acquisition of signal is of importance, such as PSK, DPSK, etc., can utilize the present invention.

A digital data input from any source of digital data or communication channel and encoded, for example in NRZ-1 format is clocked by an external or internal transmit clock to an encoder 102, which preferably comprises a convolutional encoder which, taken together with feedback decoder 104 and data interleaver 106 will, as will be described, correct errors in the digital stream caused by ionospheric scintillation fading. As is well known, convolutional encoding is the encoding of groups of data bits in overlapping or "sliding" fashion. Thus, for example, bits 1 thru 16 are encoded, then bits 2 thru 17, then bits 3 thru 18, and so on. For each data bit there is a parity bit which is compared with the received data at the decoder 104, as is well known, hence the term "feedback decoder". The data interleaving function performed by data interleaver 106 spreads adjacent bits in order that a burst of errors, such as might result from a signal fade, is also spread. Once the errors have been spread, i.e., do not occur sequentially in a number of successive adjacent bit periods, the decoder 104, by means of its parity check, can correct the errors so long as the bit-error-rate (BER) does not become excessive. Assuming, for example, that a 256-bit interleaving depth is selected, interleaver 106 will redistribute data coupled thereto from convolutional encoder 102 so that no two adjacent bits are closer than 256 bit cell lengths apart, i.e., bit-one is adjacent to bit-256, bit-2 is adjacent to bit-257, etc. The data interleaver can be set for any interleaving depth from 0 to 256 with 0 being no interleaving. When an error burst occurs over a period, for example, of seventy-five bits, it will be "spread" or interleaved throughout the message and correctable. Such a decoder-interleaver requires an almost "perfect" clock to operate effectively, since synchronization between the interleaved data must be maintained. In the event that a single timing bit were to be added or deleted, the decoder 104 output would have an unacceptably high BER until the data stored when the erroneous timing bit was added or deleted is cleared. Since, typically, interleaver 106 is comprised of a one-thousand bit shift register, this represents an unacceptable amount of data. As will be described, precise timing is maintained at all time by the bit-timing extractor 108.

Two stable crystal oscillators, 110 and 112 separated by 2500 Hz at, for example, 70 MHz±1250 Hz are switched within the two-tone FSK modulator 114, which together with post-detection FSK demodulator 126, are described in more detail with reference to FIGS. 2A and 2B.

The two-tone FSK digital output of modulator 114 is coupled to a UHF transmitter 116 for transmission via antenna 118 of the UHF data signal. The up-line transmission path passes through the ionosphere, is received by a UHF transponder satellite 120 and is retransmitted on the down-link path again through the ionosphere to antenna 122 associated with a UHF receiver 124. After demodulation by FSK demodulator 126, which detects the energy in each of two channels, "mark" for a digital (1) and "space" for a digital (0), the demodulator 126 output is a digital signal indicative of which channel has the greater amount of energy. This post-detection demodulation scheme is desirable in that signal acquisition time is minimized. The data deinterleaver 128 reorients the data to its originally encoded format, i.e., bit-1, bit-2, bit-3, etc. in accordance with a new clock derived by the bit timing extractor 108 as will be described. The output of data interleaver 128 is then decoded by feedback decoder 104 and coupled therefrom to a data utilization means, such as a computer or memory. The data interleaving scheme, while useful in spreading errors throughout the message with consequent ability to correct a large number of errors over a given time interval, has a time delay associated therewith due to the storage time associated with the interleaver shift register. Therefore, provision is made within the data interleaver 106 and data deinterleaver 128 to essentially bypass the interleaving operation during periods when ionospheric scintillation is not present, thereby alleviating the interleaver delay. The bypass function is selected through switch selection on the data interleaver 106 and the data deinterleaver 128.

Figures 2A, 2B:
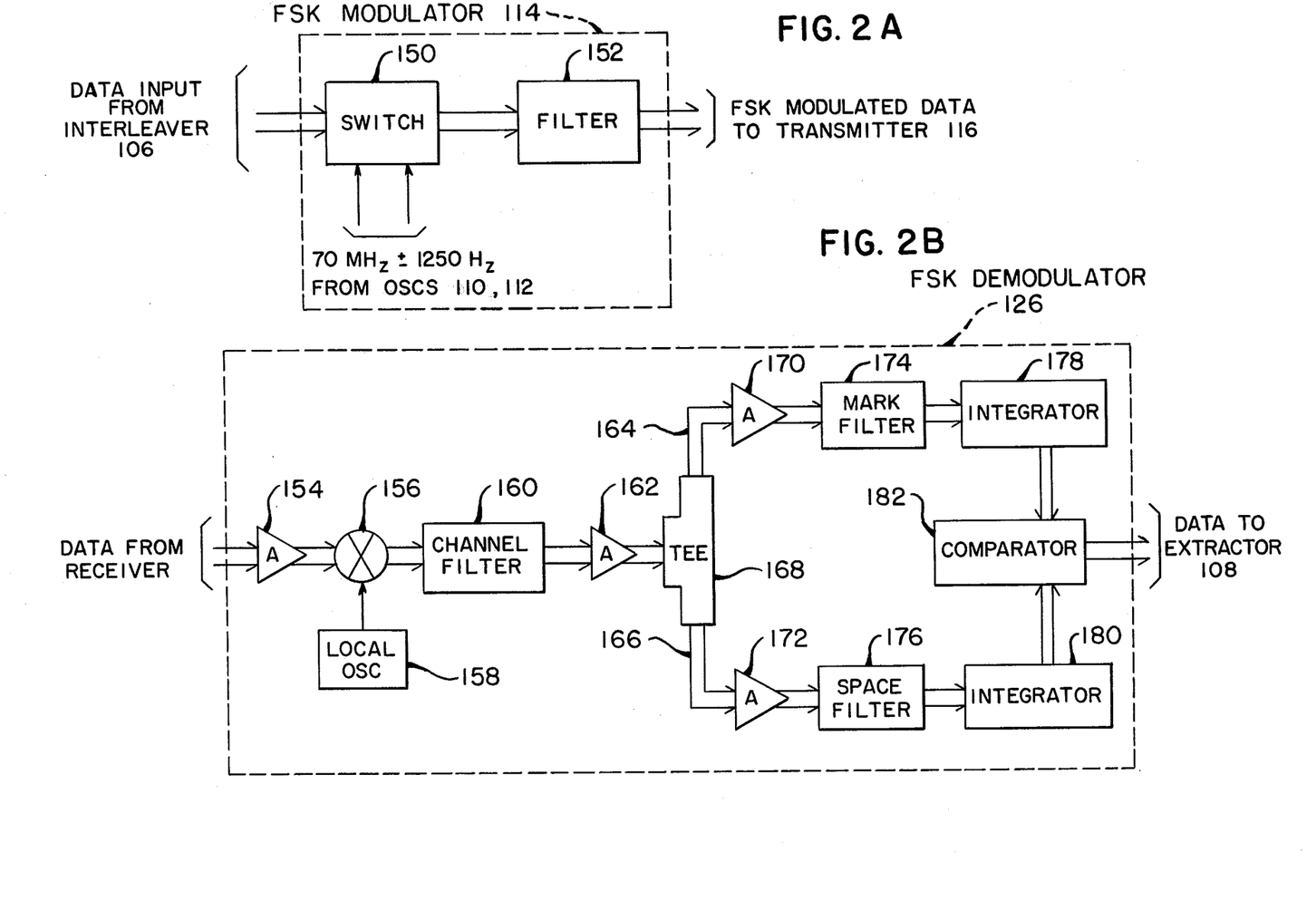
FIG. 2A is a simplified block diagram of the FSK modulator of FIG. 1.
FIG. 2B is a simplified block diagram of the post detection FSK demodulator of FIG. 1.

Referring now to FIGS. 2A and 2B, modulator 114 and demodulator 126 are illustrated. The two output frequencies of stable oscillators 110 and 112 are applied to a solid state switch 150 for modulation by the interleaved data stream from interleaver 106. If, for example, the applied stable frequencies are 70 MHz+1250 Hz or 70 MHz−1250 Hz, the output of switch 150 is a 0-dbm, 70 MHz±1250 Hz signal which, after filtering by filter 152, is coupled to transmitter 116.

The down-link UHF signal is coupled from UHF receiver 124 into demodulator 126 wherein it is amplified by a 50-db amplifier 154 and down-converted to 10.7 MHz by mixer 156 which mixes a 59.3 MHz frequency from a local oscillator 158 with the amplified data. The down-converted data is filtered by a 5 KHz bandwidth channel filter 160, amplified by an amplifier-limiter 162 and split into a "mark" or "1" channel 164 and into a "space" or "0" channel 166 by a Tee circuit 168. After amplification by amplifiers 170 and 172 in the mark and space channels respectively, the two-tone data is applied, to 2 KHz bandwidth filters 174 and 176 in mark and space channels 164 and 166 respectively, with the filter centers being separated by 2500 Hz. The signal energy in the mark channel is detected and integrated by integrator 178 while the signal energy in the space channel is detected and integrated by integrator 180. The outputs of integrators 178 and 180 are applied to a comparator 182 to derive mark/space data which is coupled from comparator 182 to the bit timing extractor 108. The amplifier-limiter 162 is operated into saturation all the time, even when only noise is present. When a signal appears in the spectrum, the noise level will decrease at the output of the amplifier-limiter as a function of signal strength. The total power of the amplifier-limiter output remains constant. The reason there is an amplifier-limiter in the system is to achieve threshold comparison. Under noise conditions there is essentially equal energy in the outputs of the mark and space factors. After the noise is integrated by 178 and 180 and is fed to the comparator, the output of the comparator will toggle randomly between mark and space according to the instantaneous noise levels.

Figure 12:
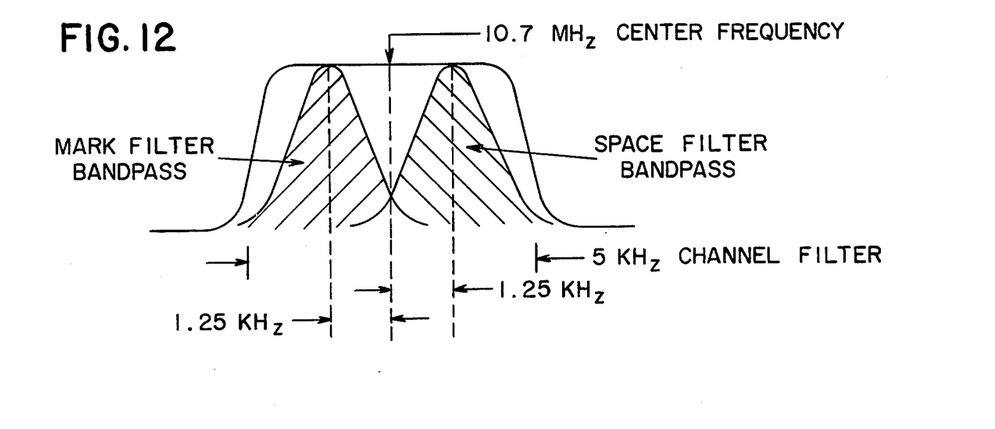
FIG. 12 illustrates waveforms derived from a portion of the invention.

Referring to FIG. 12, the channel filter, 160, is a 5 KHz filter with a center frequency at 10.7 MHz. The Tee following the limiter, 162, splits the same signal in each of two directions. The mark filter, 174, and the space filter, 176, are 2 KHz bandwidth filters, with the center frequency of the mark filter located 1.25 KHz below 10.7 MHz and the center of the space filter located 1.25 KHz above 10.7 MHz. The outputs of each of the two filters (mark and space) are integrated and compared in the comparator. If a mark signal was sent, the output of the mark channel integrator will be greater than the output of the space channel integrator, and the output of the comparator will be a mark indicator from the comparator. The opposite is true for a space channel signal. The Tee, 168, is merely a signal splitter and does not discriminate against either a mark or space signal. The mark and space filters perform the discrimination functions.

Figure 3:
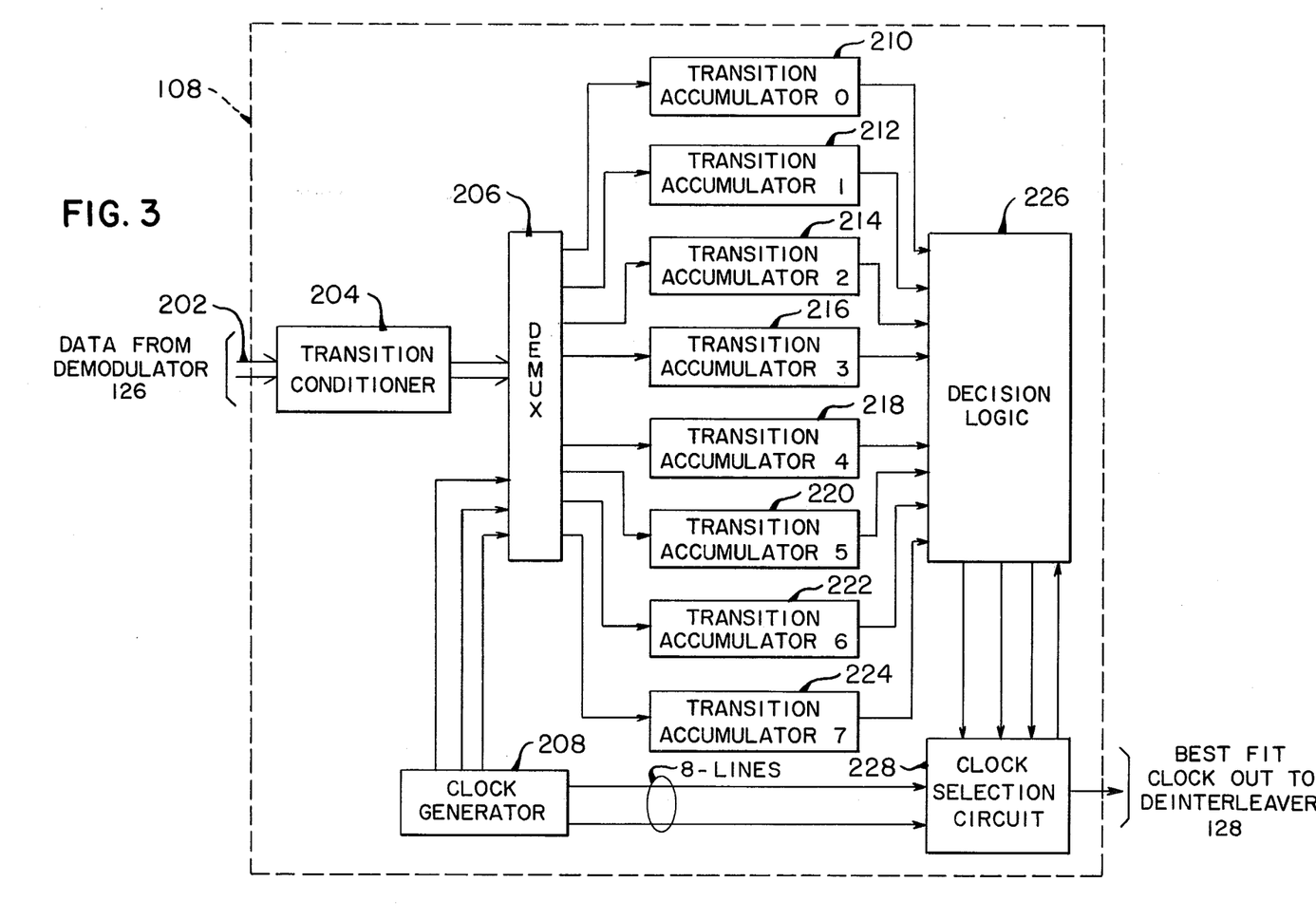
FIG. 3 is a simplified block diagram of a bit-timing extractor circuit in accordance with the present invention.

Referring now to FIG. 3, a simplified block diagram of the bit-timing extractor 108 is illustrated. Generally, transitions in the data stream in digital data systems occur at multiples of fixed time intervals, while transitions which occur at other than such fixed intervals are usually resultant from disturbances in the communications channel through which the data is propagated. Accurate bit timing is normally a requirement, with a stable frequency source as the system time base to maintain the proper phase relationship in the receiving system between the received data stream and the bit-timing being determined. While this phase relationship (between data and bit-timing) normally need not be perfect, proper clocking of data is necessary. The clock generator 208 derives eight distinct clocks from the receiver stable frequency source, all of the same frequency but incrementally displaced in phase, one from the other, by 45 degrees. At least one of these clocks is usable for data processing, while the "best-bit" clock is derived by analysis of the relative time relationship of the data transitions from the decision element of the demodulator 126, which transitions are coupled via bit-extractor input data line 202 to a transition conditioner circuit 204. Transition conditioner 204 converts the incoming data transitions into narrow pulses, and may comprise a bi-directional one-shot multivibrator, the output of which is coupled to an eight-channel demultiplexer 206 which is switched at eight times the frequency of the input data rate to remain in sync with the clock generator 208, which clock generator 208 generates the eight phase displaced clocks, each clock being associated with a particular transition accumulator 210 through 224. The demultiplexer 206 outputs are sequentially switched to accumulators 210 through 224, which accumulators may comprise binary counters, and each accumulator counts the data transitions which occur when the demultiplexer output is coupled to that particular accumulator. The time interval is switch selectable over eight or sixteen bit time intervals, thus, each bit period is divided into eight increments equal to ⅛ the time for one data bit, or slices, each associated with one accumulator. This switching time is achieved by running a stable oscillator at eight times the data rate and then the eight discrete clocks can be derived by dividing the output from the stable oscillator. After this multi-bit time interval, a decision logic circuit 226, described in greater detail with respect to FIGS. 6–10, analyzes the accumulator contents to determine by an arithmetic comparison which of the eight generated clocks should be selected as the best-fit clock. When valid or "good" data is coupled to the bit-extractor circuit 108, the transitions therein occur at fixed time intervals and only one of the accumulators 210 through 224 should accumulate data over the allocated accumulation time interval. If invalid or "bad" data is present, transitions will not occur over fixed intervals and more than one accumulator will acumulate over the accumulation interval. A data validation circuit described in detail with respect to FIG. 9 within the decision logic 226 monitors the accumulator contents to determine whether the data therein is valid or invalid. Ideally, valid data is indicated when only one accumulator contains data; however, valid data may also be indicated by configuring the data validation circuit to so indicate when more than one accumulator contains data under valid conditions. In other words, a small number of transitions in other accumulators over a multi-bit increment is "weighted" so as to be indicative of valid data. An invalid data determination during the accumulation interval resets the system. A digital comparison circuit, described with reference to FIG. 7, within the decision logic 226 determines which accumulator contains the greatest count of data transitions over a predetermined number of bits. From this comparison, a DERIVED CLOCK is generated. The DERIVED CLOCK is compared with the PRESENT CLOCK in the decision logic 226. If the two clocks are in phase the NEW CLOCK selected by clock selection circuit 228 from clock generator 208 is the same as the PRESENT CLOCK. If the DERIVED and PRESENT CLOCKS differ, and the data is indicated valid by the data validation circuit, the selected NEW CLOCK is the next phased clock (45 degrees displaced) adjacent to the PRESENT CLOCK in the direction (phase difference) of the DERIVED CLOCK. Thus, even in the case in which shifts of more than 45-degrees (one slice of the bit period) are indicated, only a 45-degree shift is made so as to prevent the clock from following noise rather than data. Clock selection circuit 228 continuously updates the PRESENT CLOCK to the NEW CLOCK so long as the data is valid and the accumulator contents (weight) is sufficient to justify a clock change. In other words, the PRESENT CLOCK signal was the previous NEW CLOCK signal during the preceeding update period. When either an invalid data or insufficient accumulator weight condition exists, the clock selection circuit 228 holds the last selected clock, i.e., no clock switch occurs.

Figure 4:
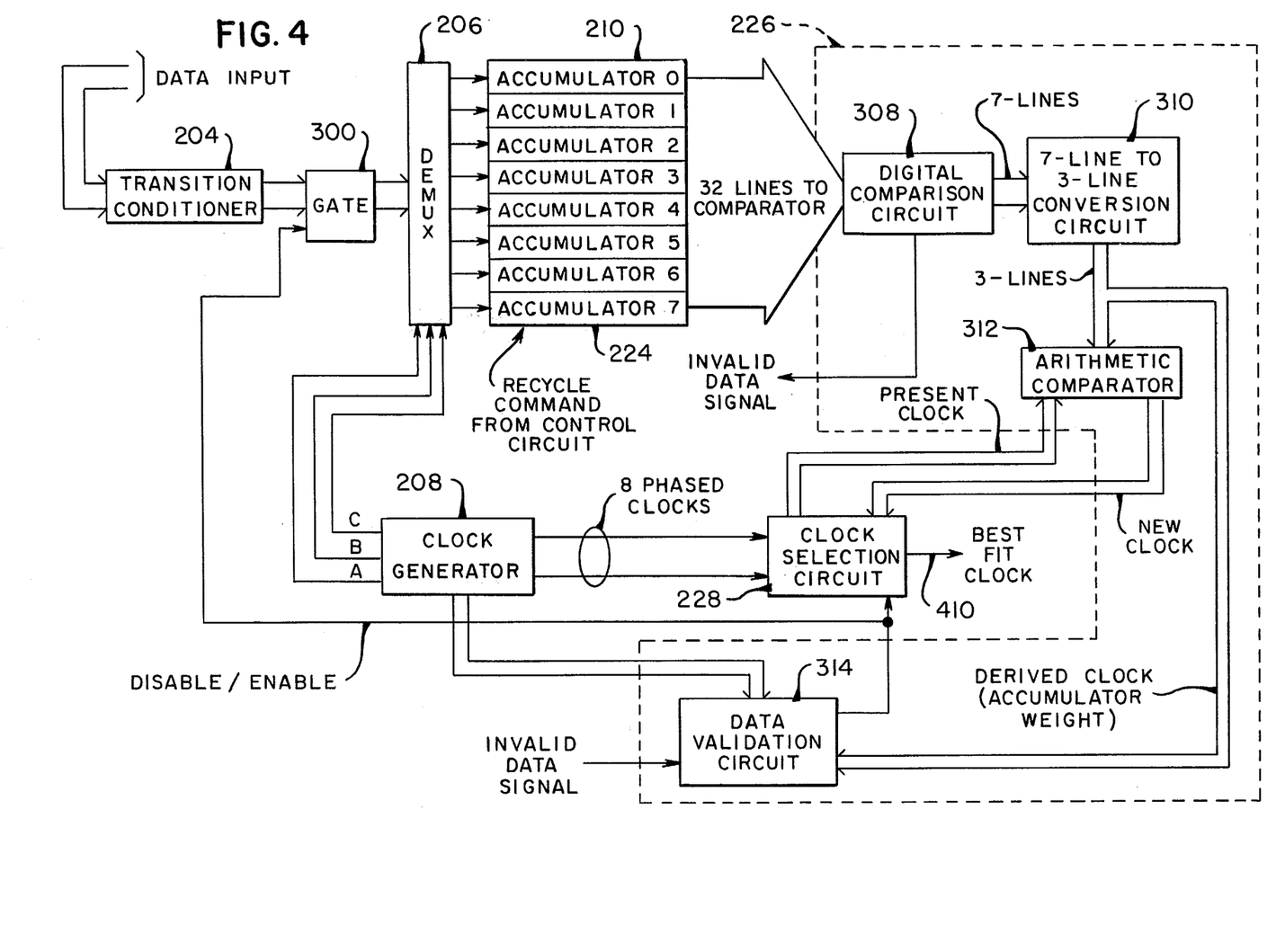
FIG. 4 is a more detailed block diagram of the bit-timing extractor circuit described with reference to FIG. 3.

Referring now to FIG. 4, a more detailed block diagram of the bit-extractor circuit 108 is illustrated. Demodulated data from the transition conditioner is gated into demultiplexer 206 as previously described, via gate 300. The demultiplexer 206, is switched synchronously by clock derivation circuit 302, which is the clock generator 208, described in more detail with reference to FIG. 5.

Figure 5:
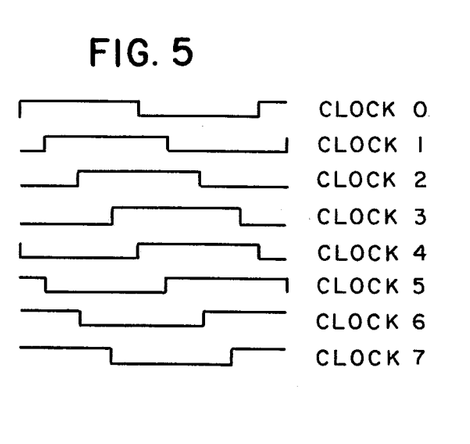
FIG. 5 is a multiphase clock generation circuit, waveform diagrams and a table of binary clock values generated in accordance therewith.
Figure 6A:
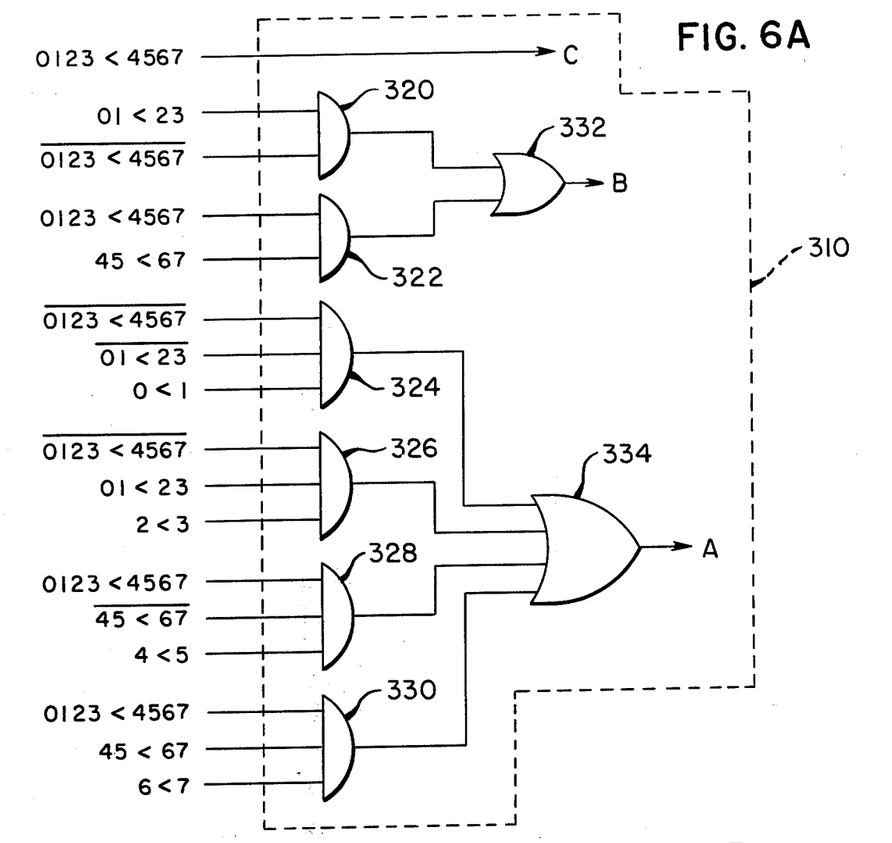
FIG. 6A is a seven-line to three-line conversion circuit utilized in the present invention.
Figure 6B:
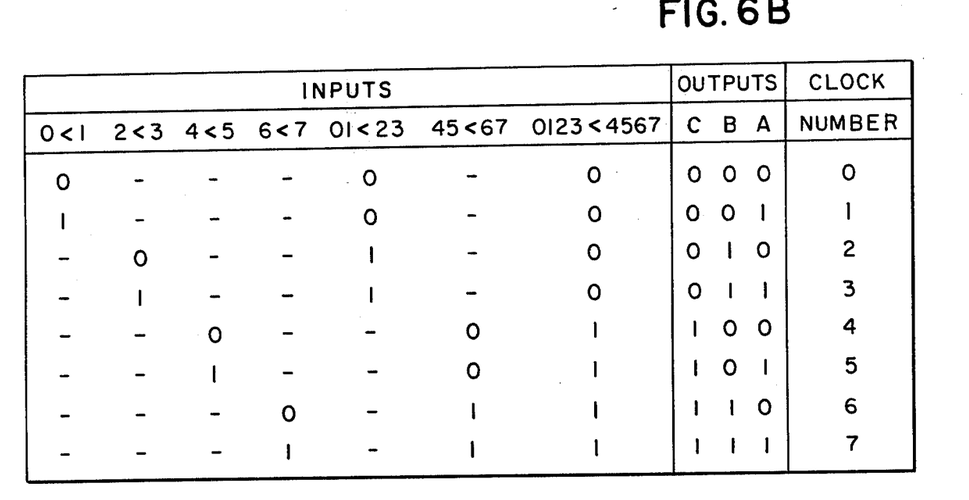
FIG. 6B is a chart relating the inputs and outputs of the circuit of FIG. 6A to generated clocks.
Figure 11:
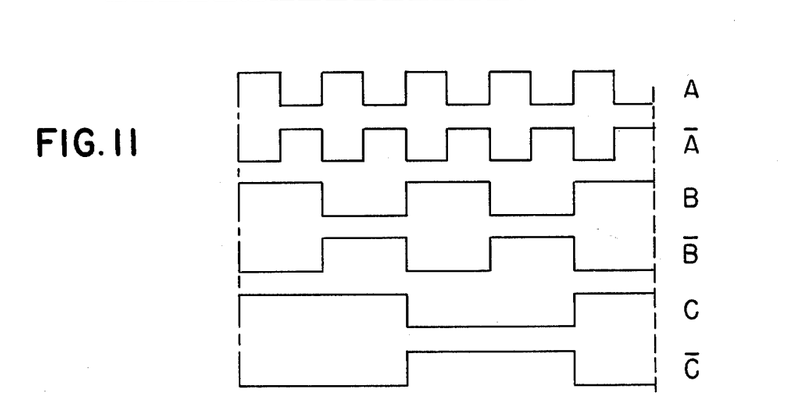
FIG. 11 illustrates waveforms that are useful in understanding the operation of the invention.

Referring to FIG. 5, a stable crystal oscillator 304 generates a 4.8 KHz clock which is divided by a binary divider network 305 into the eight phase displaced clocks illustrated as clocks 0 through 7, which are coupled to the clock selection circuit 228. Clock control lines A, B and C from a second binary divider network 306 are coupled to the demultiplexer 206 to maintain clock synchronization as the accumulators 210 thru 224 are switched in accordance with the binary code illustrated by FIG. 5. The second binary divider network 306 also provides the clock control lines D, E and F. FIG. 11 sets out the rate relationship between the signals A, B and C, along with their respective complements.

Referring back to FIG. 4, the accumulator outputs from accumulators 210 thru 224 are coupled via thirty-two lines, four lines from each accumulator, to the digital comparison circuit 308, a part of the decision logic 226, in which comparison circuit the contents of the eight accumulators are compared, each with the others, to determine which accumulator contains the most data transitions. The accumulators operate to count the number of data transitions that take place within an interval. Comparison circuit 308 may consist of eight Signetics 5408 AND gates, one for each set of four lines from each accumulator. If the lower numbered (0 thru 7) accumulator contents are equal to or greater than the higher numbered accumulator contents, then the lower number is enabled for further comparison, and so on until a single accumulator is ultimately selected. In addition, comparison circuit 308 also provides an invalid signal when the counts from various accumulators exceed a preselected number. This data is coupled on 7-lines to a 7-line to 3-line converter 310 which outputs a signal which may consist of 3-digit binary code representative of the DERIVED CLOCK for coupling to the arithmetic comparator portion 312 of the decision logic 226 and to the data validation circuit 314 described in greater detail with respect to FIG. 9. The 7-line to 3-line conversion circuit 310 is a series of AND and OR gates illustrated by FIG. 6 for receiving comparator 308 outputs and complementary outputs, which are AND'ed by AND gates 320, 322, 324, 326, 328 and 330. Digit C is the direct sequential output of the comparator 308, digit B is derived by OR'ing the outputs of AND gates 320 and 322 by OR gate 332 and digit A is derived by OR'ing the outputs of AND gates 324 thru 330 by OR gate 334.

Figure 7A:
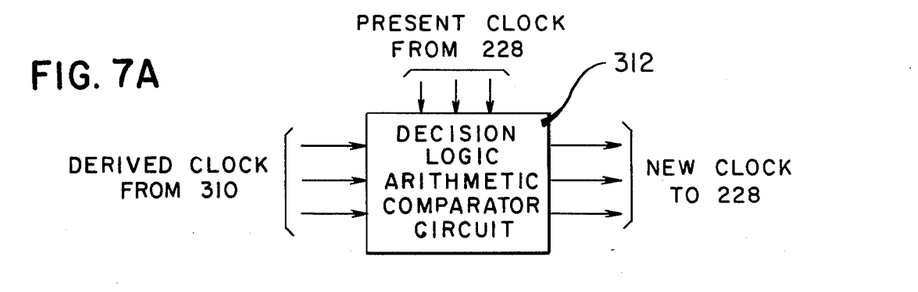
FIGS. 7A and 7B illustrate in block and schematic form respectively the arithmetic comparator portion of the decision logic of the invention.
Figure 7B:
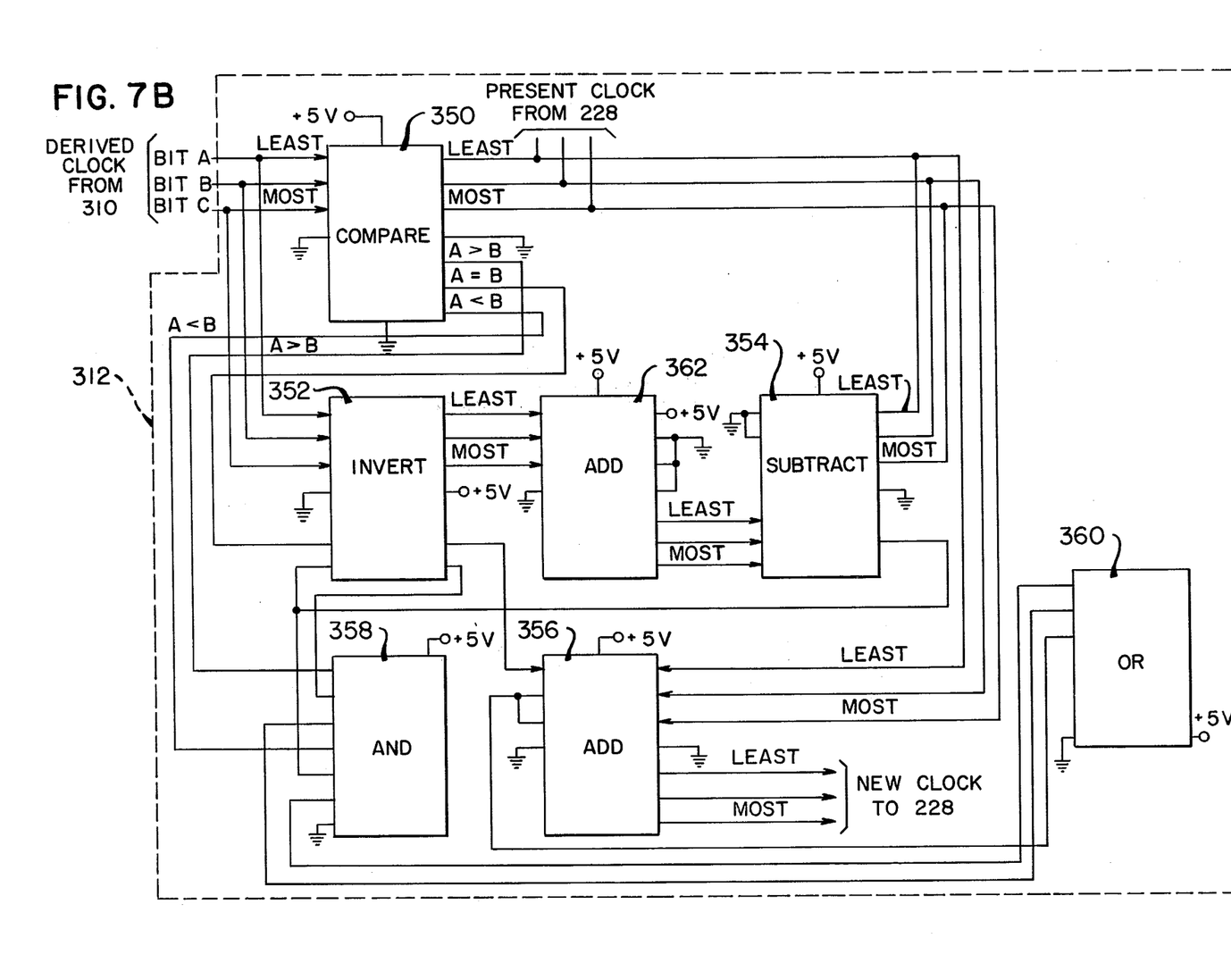

Referring now to FIGS. 7A and 7B, the arithmetic comparator portion 312 of decision logic 226 is illustrated. This logic compares the PRESENT CLOCK and the DERIVED CLOCK to determine a NEW CLOCK in accordance with the accumulator contents. Changes in the PRESENT CLOCK are limited to adjacent clocks (45-degree phase increments) for each update interval and in the direction (change of phase) of the NEW CLOCK. If the PRESENT CLOCK equals the DERIVED CLOCK, then no change is required and the NEW CLOCK equals the PRESENT CLOCK.

If the PRESENT CLOCK is greater than the DERIVED CLOCK, and the difference is greater than three (a shift of more than three accumulators, i.e., most transitions in accumulator 6 instead of accumulator 1); or if the PRESENT CLOCK is less than the DERIVED CLOCK and the difference is greater than four; then, for both of these cases, the NEW CLOCK will be one less (−45 degree phase shift) than the PRESENT CLOCK.

If the PRESENT CLOCK is less than the DERIVED CLOCK and the difference is more than three (as shown by the binary code of FIG. 5); or if the PRESENT CLOCK and the DERIVED CLOCK difference is less than four, the NEW CLOCK will be one greater than the PRESENT CLOCK (+45 degree phase shift).

The NEW CLOCK is used only when the data interval is valid, as determined by the data validation circuit 314. The decision logic circuit 312 shown in FIG. 7A is illustrated in greater detail in FIG. 7B, to which figure reference is now made.

The DERIVED CLOCK is coupled as a 3-bit binary code to a comparator 350 and to a hex-inverter 352 for deriving a complementary code. The PRESENT CLOCK is coupled as a 3-bit code to comparator 350, 4-bit adder 354 and 4-bit adder 356 with most and least significant bits as indicated. The three outputs of comparator 350 indicate, as shown:

A>B
A=B
A<B

The A=B output of comparator 350 is coupled to inverter 350 while the other outputs of comparator 350 are coupled to AND gates 358 for OR'ing via OR gate 360 with the output of 4-bit adder 356 to provide a constant clock update. When A>B or A<B, the output of inverter 352 is coupled to another 4-bit adder 362 to determine by how much. The output of adder 362 "adds 1" and is coupled to adder 354 with the PRESENT CLOCK to perform the binary subtraction of A−B, which requires the addition of a logical "1" by adder 362. The output of adder 356 is the NEW CLOCK. Other logical arrangements are possible for the arithmetic comparisons accomplished by the comparator circuit 312 and the illustrated logic is exemplary only. The integrated circuit logic devices illustrated may comprise:

350: Signetics 5485
352: Signetics 5404
354: Signetics 5483
356: Signetics 5483
358: Signetics 5408
360: Signetics 5432
362: Signetics 5483

Figure 8A:
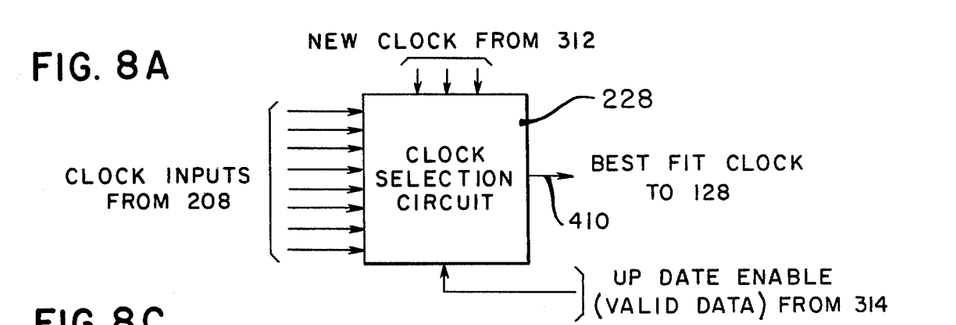
FIGS. 8A, 8B and 8C are block, logic and waveform diagrams respectively of the clock selection logic of the invention.
Figure 8B:
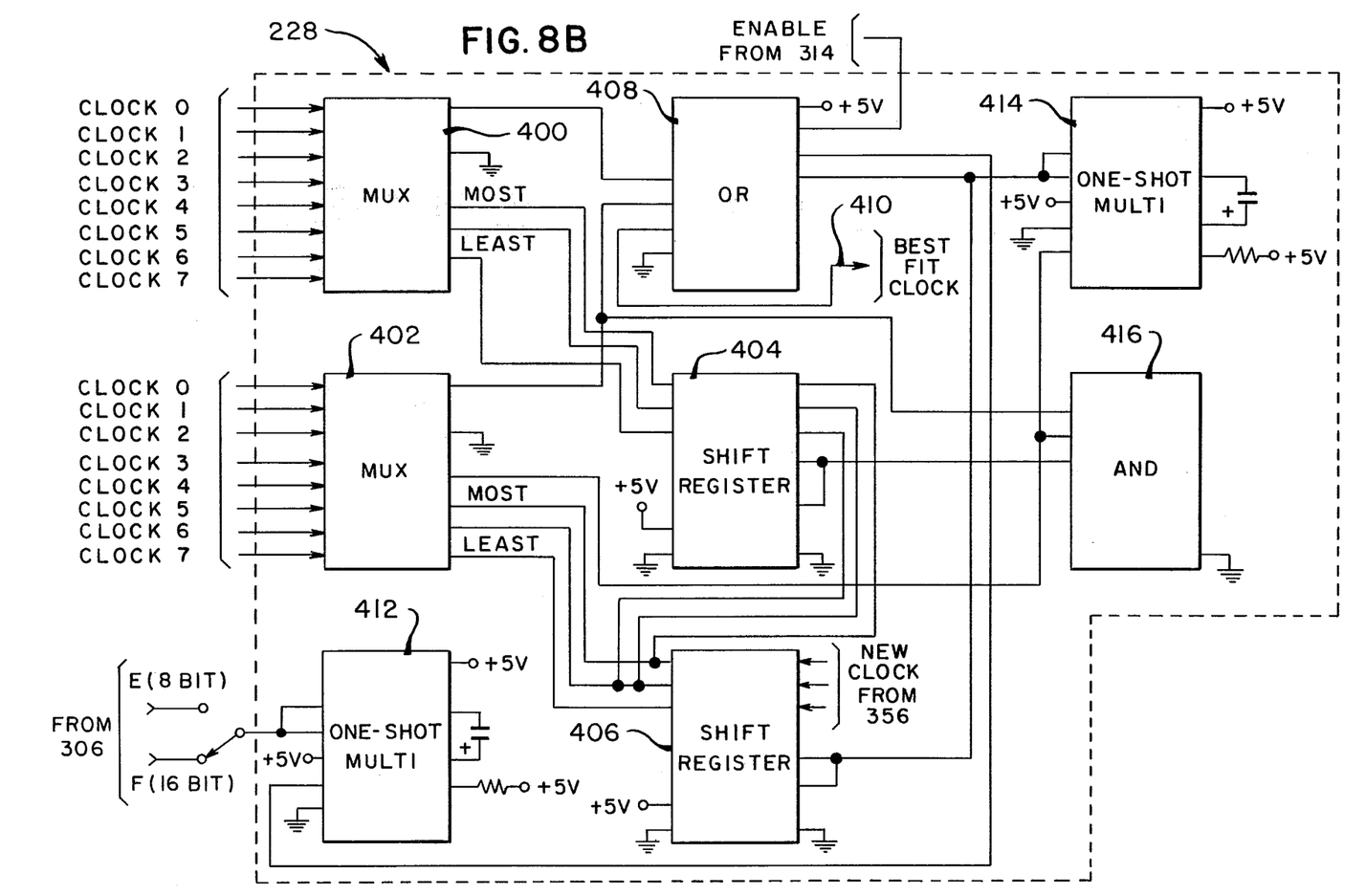
Figure 8C:
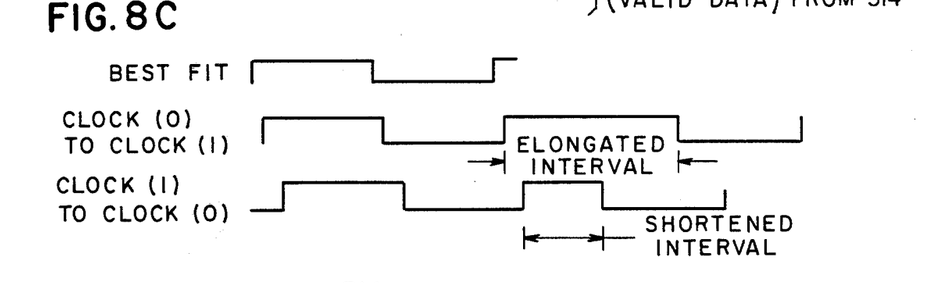

The selection of the "best-fit" clock by clock selection circuit 228 from the eight phased clocks coupled thereto as previously described, is illustrated generally by FIG. 8A, in detail by FIG. 8B, and exemplary waveforms of clock changes by FIG. 8C.

Referring now to FIGS. 8A through 8C, the eight phased clocks are coupled to clock selection circuit 228 via a pair of 8-input multiplexers 400 and 402, each of which multiplexers selects one of the eight inputs thereto in accordance with the NEW CLOCK from adder 356. The output of multiplexers 400 and 402 are coupled to a pair of 4-bit right/left shift registers 404 and 406 respectively, with the NEW CLOCK being applied to shift register 406 and to shift register 404 from shift register 406. A quadrature 2-input OR gate 408, having data inputs thereto from multiplexers 400 and 402 is enabled when valid data is present to couple out the BEST-FIT CLOCK via line 410. Either 8-bit or 16-bit data (clocks E and F respectively) is coupled to a one-shot multivibrator 412 from the binary counter 306, which multivibrator 412 generates a 100 microsecond enabling pulse to enable OR gate 408. The selection of 8-bit data allows the demultiplier 206 to cycle thru eight times, whereas selection of the 16-bit data allows the demultiplier to cycle thru sixteen times. Another one-shot multivibrator 414, having a 100 microsecond pulse width can hold the selection when triggered via OR gate 408. The PRESENT CLOCK and an output from shift register 404 are AND'ed by AND gate 416, which, together with the output of OR gate 408 cause the triggering of multivibrator 414 when required. Thus, the "best-fit" clock is selected from the generated clock inputs by either "holding" the PRESENT (0) CLOCK; elongating a clock pulse to advance the clock phase; or shortening the clock pulse to retard the clock phase, as illustrated by FIG. 8C. No new pulses are added or deleted from the clock. Existing clock pulses are either elongated or shortened. By way of example only, the following integrated circuit devices may comprise the various illustrated components in FIG. 8B:

multiplexers 400 and 402—Signetics 54151
shift registers 404 and 406—Signetics 5495
OR gate 408—Signetics 5432
one-shot multis 412 and 414—Signetics 54121
AND gate 416—Signetics 5408

Figure 9A:
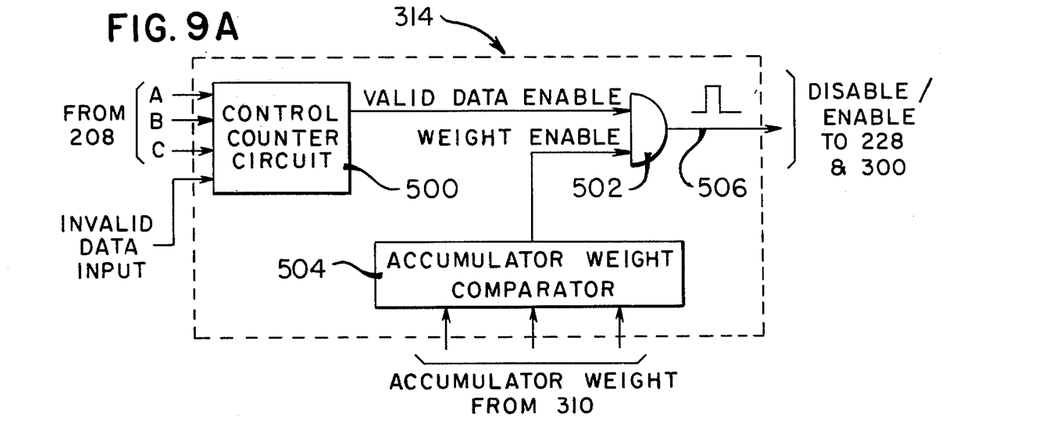
FIGS. 9A and 9B are block and logic diagrams respectively of the data validation logic of the invention.
Figure 9B:
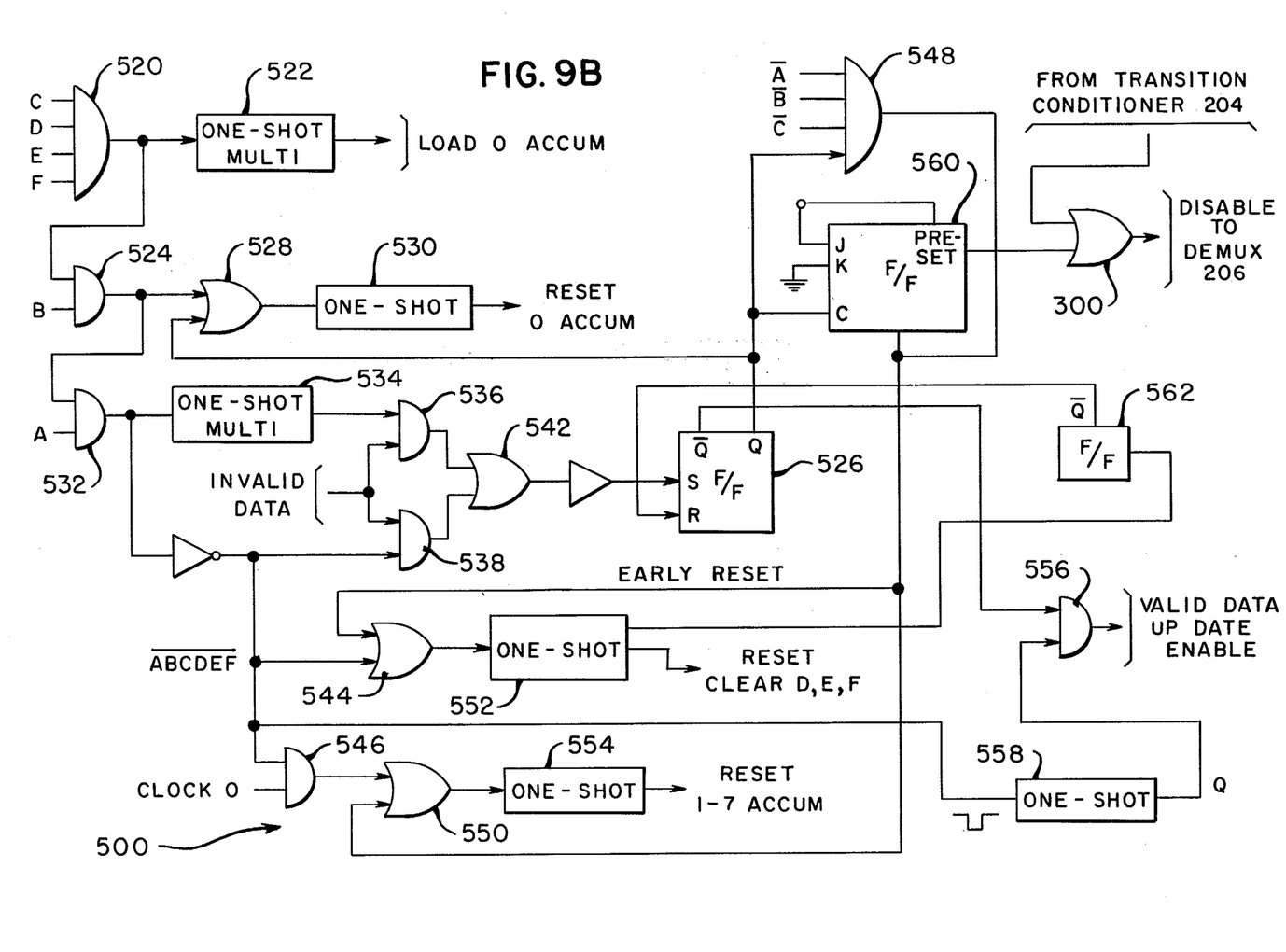
Figure 10A:
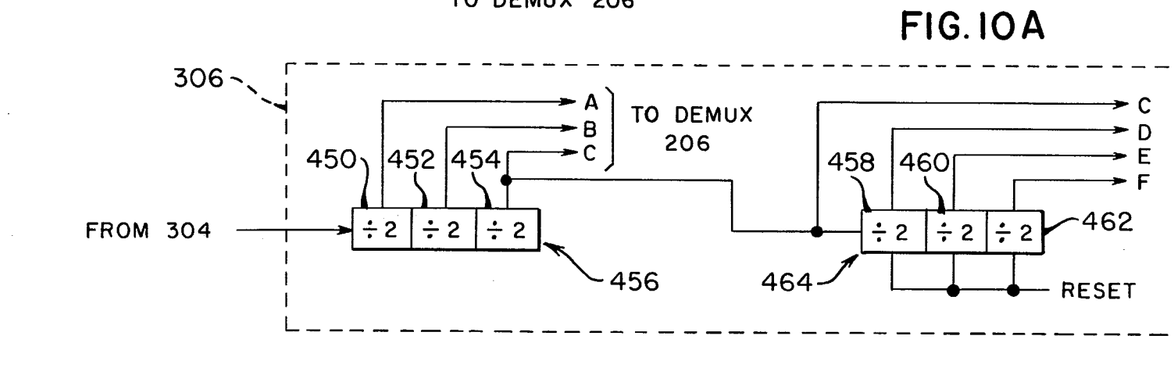
FIGS. 10A and 10B are simplified block diagrams of a clock generator which may be utilized in the preferred embodiment of the invention.
Figure 10B:
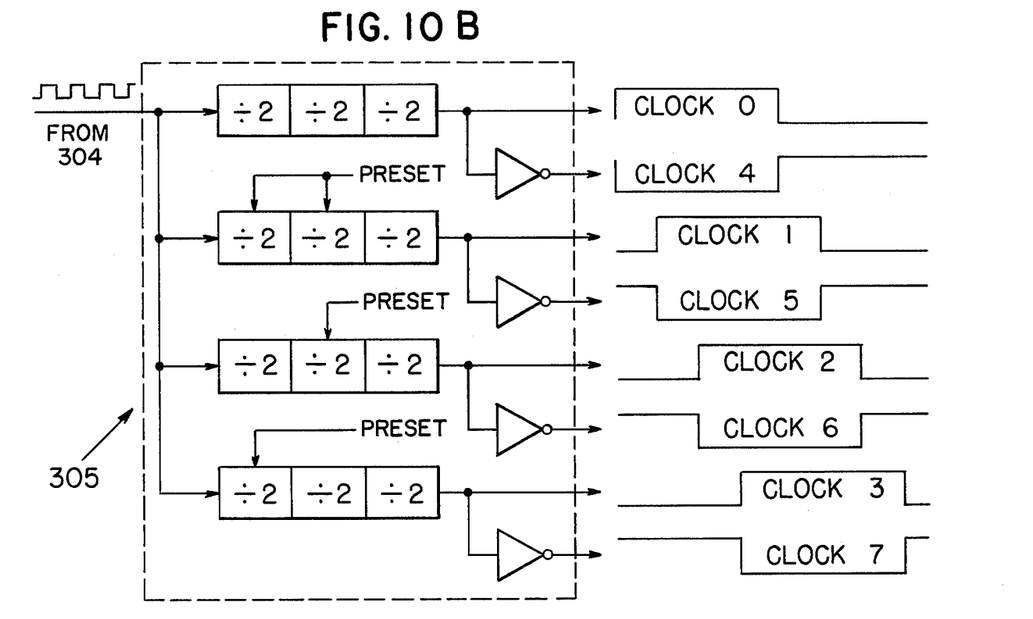

Referring now to FIGS. 9A and 9B, the data validation circuit 314 will now be described. As previously described with respect to FIG. 5, the binary divider network 306 of the clock derivation circuit 302 generates a 3-bit binary code which can be associated with the generated clocks. FIG. 10A is illustrative of the binary divider 306 wherein the pulse train from oscillator 304 is divided by divider 456 comprised of divide-by-two circuits 450, 452, 454 and 456 for deriving binary signals A, B and C. Further division in binary counter 464 divide-by-two circuits 458, 460 and 462 derive control signals D, E and F respectively. FIG. 10B illustrates a bank of ÷2 units wherein the clock 0 signal on its rising edge provides the PRESET signal.

The data validation control counter circuit 500 of FIG. 9A counts the number of times the demultiplexer 206 has cycled, either eight or sixteen times, and monitors via AND gate 502 for an INVALID DATA output from the control circuit 500 or from the accumulator weight comparator circuit 504. Counting is achieved through the use of the divider 306 shown in FIG. 10A. When there is an output at E the counter has counted 8 bits and when there is an output at F the counter has counted 16 bits. If, at the end of eight (or sixteen) cycles, as the case may be, no INVALID DATA signal is received at AND gate 502, an enabling pulse via line 506 enables the clock selection circuit. Additionally, the clock switching circuit will be updated when and only when the accumulator weight of the DERIVED CLOCK is sufficient, i.e., if all or nearly all data transitions are in a single accumulator.

Referring now to FIG. 9B, clock selection codes C, D, E and F are applied to AND gate 520, the output of which AND gate triggers a one-shot multivibrator 522 for generating the load pulse for loading the zero phase clock accumulator 210. Binary code B data is AND'ed with the output of AND gate 520 in AND gate 524. The output of AND gate 524 is OR'ed with an invalid data signal from an edge-triggered flip-flop 526 in OR gate 528, the output of which OR gate is applied to a one-shot multivibrator 530 for generating a RESET signal for counter 464 with data is invalid. The output of AND gate 524 is AND'ed with the binary code A at AND gate 532 to derive a trigger pulse for triggering a one-shot multivibrator 534 having a pulsed output coupled to one input of AND gate 536, the INVALID DATA signal being coupled to the other input thereof. The INVALID DATA input is also applied to one input of AND gate 538 while the inverted output from AND gate 532 is coupled to the other input of AND gate 538, after inverting by inverter 540. The INVALID DATA outputs from AND gates 536 and 538 are OR'ed by OR gate 542 having an output coupled to the SET input of flip-flop 526. The output of inverter 540, the complement of ABCDEF, is coupled to one input of OR gate 544 and one input of AND gate 546. The other input to OR gate 544 is the EARLY RESET signal from AND gate 548, which EARLY RESET signal is also applied to one input of OR gate 550. The zero phase clock is applied to the other input of AND gate 546, the output of which AND gate is the other input to OR gate 550 together with the EARLY RESET. One-shot multivibrator 552 is triggered by the output of OR gate 544 and has a RESET output for clearing divide-by-two circuits 458, 460 and 462. Another RESET is generated by one-shot multivibrator 554 for resetting the accumulators. The VALID DATA and UPDATE ENABLE pulse is derived from the output of AND gate 556, which AND gate 556 has as one input the complementary data output of the invalid data flip-flop 526 and as the other input the output of one-shot multivibrator 558, which multivibrator is triggered by the complementary ABCDEF output inverter 540. Complementary inputs ABC and AND'ed with the data output of flip-flop 526 by AND gate 548 to derive the EARLY RESET signal. The data output of INVALID DATA flip-flop 526, which is coupled to OR gate 528 for resetting the zero phase accumulator is also applied to the clock input of a JK flip-flop 560, which is cleared by the EARLY RESET and has a preset output coupled to OR gate 300 together with the output of transition conditioner for disabling the demultiplexer 206. Edge triggered flip-flop 526 is reset by the inverted data output of a one-shot reset flip-flop 562, which flip-flop is triggered by the output of one-shot multivibrator 552.

While the invention has been shows and described with reference to preferred embodiments thereof, it will be understood that persons skilled in the art may make modifications thereof without departing from the spirit and scope of the invention as defined by the claims appended hereto.

What is claimed is:

1. A circuit for synchronizing an incoming digital data bit stream clocked by a PRESENT CLOCK signal with a BEST-FIT clock signal, comprising:
    dividing means for dividing each bit period into a plurality of increments, each increment being representative of a different transition phase shift;
    transition means operatively connected to said dividing means for counting the number of data transitions which occur during each of said bit increments for a predetermined number of bits;
    logic means operatively connected to said transition means for generating a digital code representative of the increment containing the greatest transition count;
    clock generation means for generating a plurality of phased clock signals of like frequency but different phase, each clock signal being associated with one of said bit increments;
    clock signal selection means for comparing said PRESENT CLOCK signal with said digital code for selecting said BEST-FIT clock signal from one of said phased clock signals for synchronizing said data with said BEST-FIT clock signal such that said BEST-FIT clock signal become the PRESENT CLOCK signal for the next comparison; and
    data validating means responsive to said transition means for inhibiting said clock signal selection means so as to prevent said PRESENT CLOCK from shifting to become said adjacent phased clock signal when more than one of said bit increments contains transitions counted by said transition means.

2. A circuit for synchronizing phase shifted data bits when a clock signal comprising:
    means for dividing each of said data bits into a plurality of increments;
    transition means for counting the number of data transitions which occur during said increments for a predetermined number of bits;
    means for generating a signal indicative of the particular increment containing the most transitions counted over said predetermined number of bits;
    means for generating a plurality of phased clock signals of like frequency but different phase, each of said phased clock signals being associated with one of said increments;
    means for selecting one of said phased clock signals in response to said generated signal;
    means for utilizing said selected phased clock signal to synchronize said data; and
    data validation means for inhibiting said means for selecting one of said phased clock signals when more than one of said bit increments contains data transitions.

3. A bit-timing circuit for deriving a clock signal synchronous with the data transitions of a stream of digital data bits during intervals of phase shift of said data bits, comprising:

means for generating N phased clock signals, of like frequency but displaced in phase, one from the other, by 360°/N wherein N is an integer greater than ONE;

transition conditioning means for converting said data transitions into pulses;

means for dividing each bit period into N portions during certain of which portions said pulses occur;

N accumulator means coupled to the output of said dividing means for counting the transitions occurring during said N portions of said bit period, over a predetermined multi-bit time interval, each of said N portions being associated with one of said accumulators;

means for analyzing the contents of said N accumulators for determining which accumulator contains the greatest count, and for generating a signal representative of said determination;

clock selection means responsive to the signal generated by said analyzing means for selecting one of said N phased clock signals for clocking said data such that said selected clock signal is in phase with the portion of said bit period during which most of said transitions occur; and data validation circuit means for inhibiting said clock selection means for switching from said input clock signal when more than one N accumulator means contains data transitions.

4. A bit-timing circuit in accordance with claim 3 wherein said data validation circuit means further comprises means responsive to the number of accumulator transitions so as to inhibit said clock selection means when the number of accumulator transitions exceeds a predetermined amount.

5. A circuit for synchronizing phase shifted data transitions with a clock comprising:

means for dividing each of the data bit periods during which said transitions occur into a plurality of increments;

accumulator means operatively responsive to said means for dividing for counting the number of transitions which occur during each of said increments for a predetermined number of bits;

means operatively responsive to said accumulator means for generating a digital code indicative of the bit increment containing the most transitions counted over said predetermined number of bits;

means for generating a plurality of phased clocks of like frequency but different phase, each of said phased clock being associated with one of said increments;

means for selecting one of said phased clocks in accordance with said digital code for synchronizing said data; and data validation means responsive to said generated digital code for inhibiting said means for selecting one of said phase clocks when transitions are counted in more than one increment.

6. A circuit in accordance with claim 5 and further comprising:

means for detecting the transition count in increments other than the increment containing the highest transition count and for providing an output to said data validation means when the count exceeds a predetermined amount, so as to inhibit said clock selecting means.

7. A method of synchronizing phase shifted data bits with a clock comprising the steps of:

dividing each of said data bits into a plurality of increments;

counting the number of data transitions which occur during said increments for a predetermined number of bits;

generating a selection signal indicative of the particular increment containing the most transitions counted over said predetermined number of bits;

generating a plurality of phased clocks of like frequency but different phase, each of said phased clocks being associated with one of said increments;

selecting one of said phased clocks in response to said selection signal;

utilizing said selected phased clock to synchronize said data; and determining whether more than one increment contains data transitions;

inhibiting the selection of said phased clocks when data transitions are counted in more than one increment.

* * * * *